(12) United States Patent
Tanaka

(10) Patent No.: US 11,720,297 B2
(45) Date of Patent: Aug. 8, 2023

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Hirotomo Tanaka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/346,056

(22) Filed: Jun. 11, 2021

(65) Prior Publication Data
US 2021/0397385 A1     Dec. 23, 2021

(30) Foreign Application Priority Data
Jun. 17, 2020    (JP) ................................ 2020-104669

(51) Int. Cl.
*G06F 3/12*      (2006.01)

(52) U.S. Cl.
CPC ............ *G06F 3/1207* (2013.01); *G06F 3/121* (2013.01); *G06F 3/1208* (2013.01); *G06F 3/1259* (2013.01); *G06F 3/1272* (2013.01); *G06F 3/1275* (2013.01); *G06F 3/1287* (2013.01)

(58) Field of Classification Search
None
See application file for complete search history.

(56) References Cited

U.S. PATENT DOCUMENTS

| 2013/0136315 A1* | 5/2013 | Kawamoto | ............... G06T 5/00 382/112 |
| 2015/0077800 A1* | 3/2015 | Yamagishi | ............. G06Q 50/04 358/1.15 |
| 2018/0048772 A1* | 2/2018 | Sakatani | ............ H04N 1/00031 |
| 2018/0152573 A1* | 5/2018 | Taki | ................... H04N 1/00663 |

FOREIGN PATENT DOCUMENTS

| JP | 2008-009863 A | 1/2008 |
| JP | 2016-115362 A | 6/2016 |

OTHER PUBLICATIONS

Idealliance, Print Quality exchange (PQX) Specification, Jun. 22, 2016 https://idealliance.org/specifications/pqx/.*

* cited by examiner

*Primary Examiner* — Fan Zhang
(74) *Attorney, Agent, or Firm* — Canon U.S.A., Inc., IP Division

(57) ABSTRACT

An information processing apparatus includes a reception unit configured to receive print data containing quality request data, a generation unit configured to generate a job based on the quality request data received by the reception unit, a transmission unit configured to transmit the job generated by the generation unit to a job processing apparatus, and another generation unit configured to generate product quality data indicating a quality of a product generated by processing the job by the job processing apparatus, wherein, in a case where the quality of the product does not satisfy a quality requested by the quality request data, the another generation unit generates the product quality data indicating that the quality requested by the quality request data is not satisfied.

18 Claims, 13 Drawing Sheets

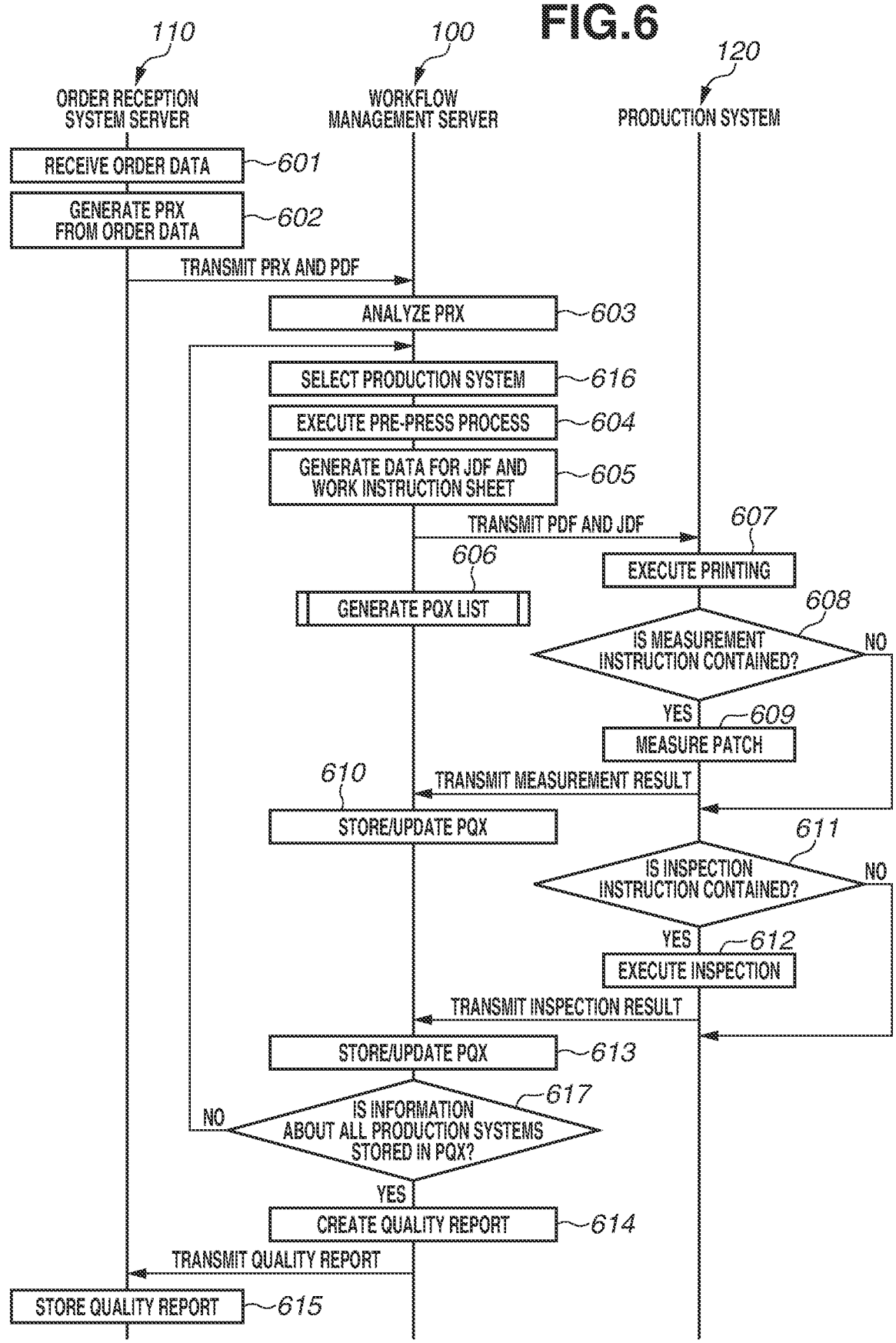

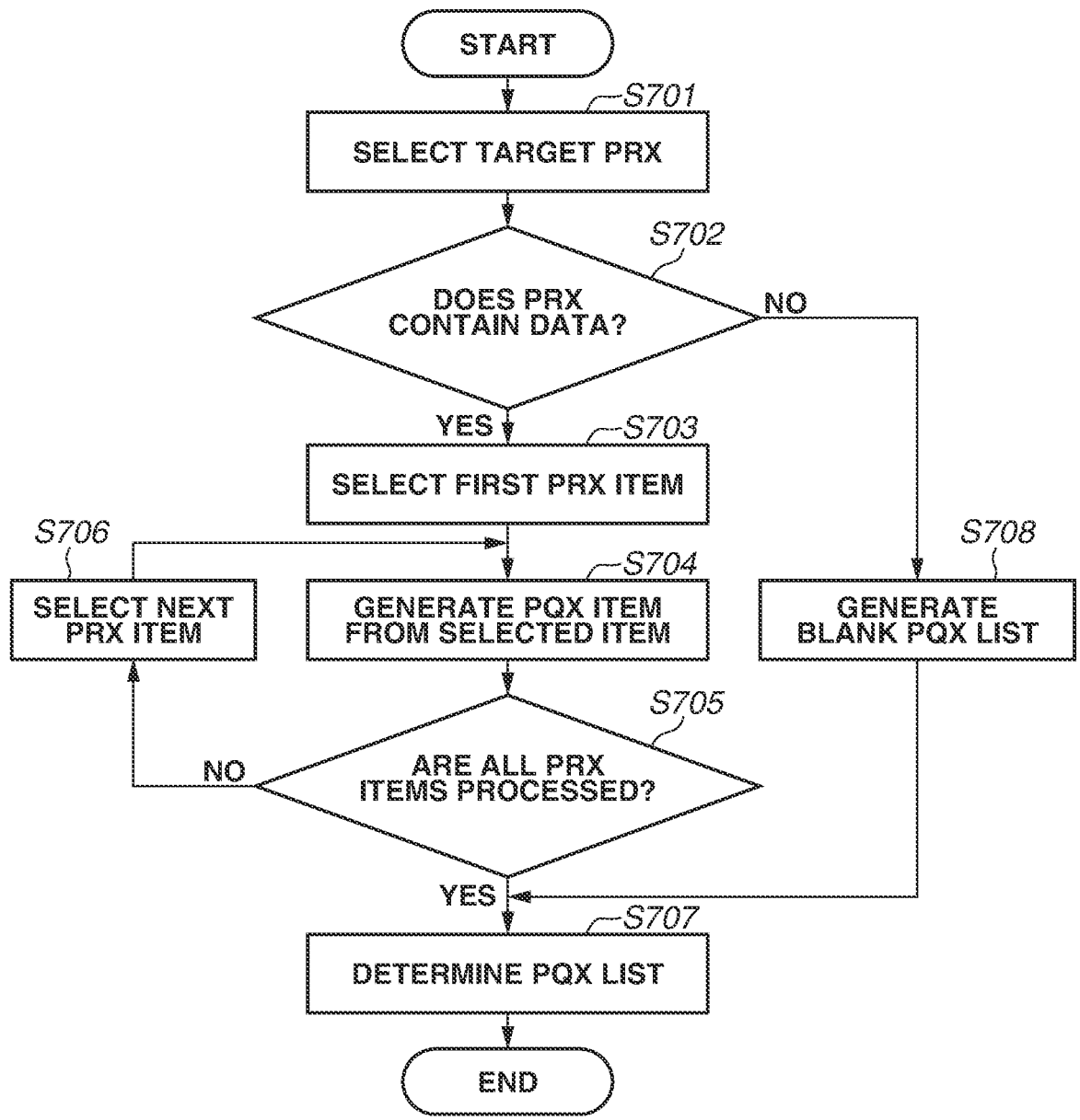

FIG.8

| | 801 Quality | 802 Name | 803 Sampling Position | 804 [Col] Type | 805 [Col] CxFReferenceObjectIdLink | 806 Score |
|---|---|---|---|---|---|---|
| 1 | Color | BabyCheek | XX01 | Build (Patch) | YY01 | dE00 < 3.0 |
| 2 | Color | JapanColor | XX02 | JP01 (Chart) | YY02 | dE00 < 5.0 |
| 3 | Barcode | QRCode | XX11 | --- | --- | ISOVerification = PASS |
| 4 | Registration | XMaxOffset | XX21 | --- | --- | 0.1 mm |
| 5 | Registration | YMaxOffset | XX22 | --- | --- | 0.2 mm |

FIG.9

| | Report | Name | PositionOnSample | Result |
|---|---|---|---|---|
| 1 | ColorReport | BabyCheek | XX01 | Build (Patch)/ZZ01 |
| 2 | ColorReport | JapanColor | XX02 | JP01 (Chart)/ZZ02 |
| 3 | BarcodeReport | Barcode2DEntry | XX11 | PASS |
| 4 | RegistrationReport | VarianceReport | XX21 | Reg002/0.06 mm |
| 5 | RegistrationReport | VarianceReport | XX22 | Reg002/0.18 mm |

901 902 903 904

INFORMATION PROCESSING APPARATUS, METHOD OF CONTROLLING INFORMATION PROCESSING APPARATUS, AND STORAGE MEDIUM

BACKGROUND

Field of the Disclosure

The present disclosure relates to an information processing apparatus, a method of controlling an information processing apparatus, and a storage medium.

Description of the Related Art

Print on demand (POD), production printing, and commercial printing are forms of printing service. In these service forms, a client (also referred to as "end user") orders and requests printing, and a printing company delivers a printed product. The client provides specifications for a printed product to be ordered, and, if needed, image data for use in printing to the printing company and places an order for a print. The specifications for the printed product are elements that determine details of the printed product, such as the type of a sheet to be used, finishing settings such as bookbinding and stapling, the number of sheets to be printed, and the number of copies. The printing company creates a printed product based on details of the request and the image data and delivers the created printed product to the client.

In the commercial printing services, the printing company uses various devices and software during the process starting from the receiving of an order for a printed product to the delivering of the ordered printed product. For example, a printing apparatus for printing on a sheet, a finisher for bookbinding and stapling, and an inspection apparatus for verifying and inspecting a printed material are used. A web server for receiving an order for a printed product from the client and a terminal and software for managing the production of a printed product are also used. Further, there is a plurality of users of the devices and software. For example, there are an order-receiving person who manages a received order and contacts the client, a process designer who designs a process for completing a printed product, an operator who operates the printing apparatus and the inspection apparatus, and a checker who checks the quality of a final printed product. Further, a printing company may have a plurality of production sites, and in this case, the printing company determines which production site a printed product is to be produced at based on details of an order.

In the commercial printing services, the printing company often receives a designated quality condition for the printed product from the client. The quality condition is different from the specification for a printed product and refers to a condition that relates to a quality of the printed product, such as an amount of misregistration between an image on the front of a sheet and an image on the back of the sheet, a color value of an image or a logo in a product, and a variation in the image color values between a plurality of copies or a plurality of pages. Printed products can be various printed products including handouts such as flyers and pamphlets, photobooks, books, name cards, and exhibit panels, and uses and prices of printed products also vary, so that required quality conditions and levels also vary.

In order to satisfy the quality condition, the printing company needs an operation process and a process of verifying the quality of the printed product.

The operation process is an operation of adjusting various apparatuses to satisfy the quality condition. For example, a color adjustment operation is needed to adjust a color to a specific color on a specific sheet of a printing apparatus based on a sample printing result agreed by the client. Further, in a case where the condition is that a misregistration between prints on the front and back of a printed product is within a predetermined range, an operation of adjusting a printed image position is needed. Furthermore, an adjustment result verification operation of verifying a state of an apparatus adjusted by the adjustment operations is also included.

Meanwhile, the quality verification process is a process of verifying whether a produced printed product satisfies the quality condition. For example, a printed product that is determined as not satisfying a print condition by the inspection operation after the printing is detected as a defective product, and the defective product is eliminated. The inspection operation is performed by the checker or is automatically performed by the inspection apparatus. Further, as needed, a quality report indicating that the printed product satisfies the quality condition is created for the client.

The above-described processes are determined by the process designer based on the type of a printed product to be obtained and a print condition. As described above, there are various forms of printed products to be processed by the commercial printing services. Furthermore, the printing company often possesses a plurality of types of apparatuses, and the process designer selects an optimum apparatus from the apparatuses and reflects the selected apparatus in each process. Thus, the process designer is required to have high skills and empirical values and is required to perform a large amount of operations.

Quality condition information and quality verification result information that are necessary for the process design and the quality report generation have not been defined in a standardized information format. Thus, a printing company that receives orders receives quality conditions in different information formats from a plurality of clients, and this has been an issue in designing an operation process. Furthermore, it has been complicated also for a client placing an order to exchange a quality condition and a quality report in different information formats when placing orders for printed products with a plurality of printing companies.

Japanese Patent Application Laid-Open No. 2008-009863 discusses a technique for developing a workflow for receiving an order for a printed product. In the technique discussed in Japanese Patent Application Laid-Open No. 2008-009863, a process is searched from a database in which definitions of individual processes of a workflow for satisfying a specification for a printed product are registered. Then, the processes are combined together to develop a workflow for producing a printed product that complies with an order reception condition. According to the technique discussed in Japanese Patent Application Laid-Open No. 2008-009863, workflows of different order reception conditions with necessary costs are presented to the client to provide discount information to the client. Thus, the client can select a desired workflow from the plurality of workflows of different costs after comparing the specifications and the costs.

Further, Japanese Patent Application Laid-Open No. 2016-115362 discusses a client characterization database in which history data is accumulated for each client in association with purposes of use of previously-delivered printed materials, image quality indexes, and client evaluations. Image quality distribution data indicating a distribution of image quality indexes that satisfy a client-requested quality is acquired from the history data accumulated in the client characterization database, and an image quality distribution of printed materials is obtained to present an optimum print.

In recent years, a quality management system that presents a quality of a printed material (product) to the end user using a workflow and a database has been developed as discussed in Japanese Patent Application Laid-Open Nos. 2008-009863 and 2016-115362.

In a case where a quality management system using Print Requirement eXchange (PRX) and Print Quality eXchange (PQX) is realized, the end user transmits a notification of quality request data (PRX) indicating a quality condition to a printing company via an order reception system. Then, the printing company adjusts the quality based on the quality condition set by the end user via the order reception system and performs printing. The product verification data (PQX) is prepared, and the end user receives the product verification data (PQX) either with the product or via the order reception system so that the end user can verify whether the product satisfies the quality condition.

Further, in a case where a printing company possesses two or more production systems, the quality management system sequentially verifies the production systems (e.g., POD device and offset device) of the printing company to determine whether the quality condition can be satisfied. Then, the printing company performs printing using the production system that satisfies the quality condition, and a notification of product verification data is transmitted to the end user.

In the above-described quality management system, since the purpose is to notify the end user of the product quality, only a quality result of a product that is printed to satisfy the request quality is described in the existing PQX format. In other words, a quality level of a product that is printed but does not satisfy the request quality is not recorded.

SUMMARY

According to embodiments of the present disclosure, an information processing apparatus includes a reception unit configured to receive print data containing quality request data, a generation unit configured to generate a job based on the quality request data received by the reception unit, a transmission unit configured to transmit the job generated by the generation unit to a job processing apparatus, and another generation unit configured to generate product quality data indicating a quality of a product generated by processing the job by the job processing apparatus, wherein, in a case where the quality of the product does not satisfy a quality requested by the quality request data, the another generation unit generates the product quality data indicating that the quality requested by the quality request data is not satisfied.

Further features of the present disclosure will become apparent from the following description of exemplary embodiments with reference to the attached drawings.

BRIEF DESCRIPTION OF THE DRAWINGS

FIG. 6 is a sequence diagram illustrating a software process according to an exemplary embodiment.

FIG. 7 is a flowchart illustrating a software process according to an exemplary embodiment.

FIG. 8 is a diagram illustrating an example of a Print Requirement eXchange (PRX) database according to an exemplary embodiment.

FIG. 9 is a diagram illustrating an example of a Print Quality eXchange (PQX) database according to an exemplary embodiment.

DESCRIPTION OF THE EMBODIMENTS

Various exemplary embodiments of the present disclosure will be described in detail below with reference to the attached drawings. It should be noted that the following exemplary embodiments are not intended to limit the scope of the disclosure and that not every combination of features described in the exemplary embodiments is always essential to a technical solution of the present disclosure.

In the following exemplary embodiments, Print Requirement eXchange (PRX) and Print Quality eXchange (PQX) formats, which are standardized techniques under development, are used as standardized information formats for transmitting a quality condition and a quality report. PRX refers to a standard data format for required quality condition for printing. Use of PRX makes it possible to describe quality conditions for different clients or different received orders in the standardized standard data format. PQX refers to a standard data format for print quality reports. PQX makes it possible to transmit printed product quality data in a standard data format. As described above, use of PRX and PQX makes it possible to transmit a quality condition and a quality report, which were not standardized, in a standardized information format.

<Brief Description of Entire Printing System>

Figure 1:
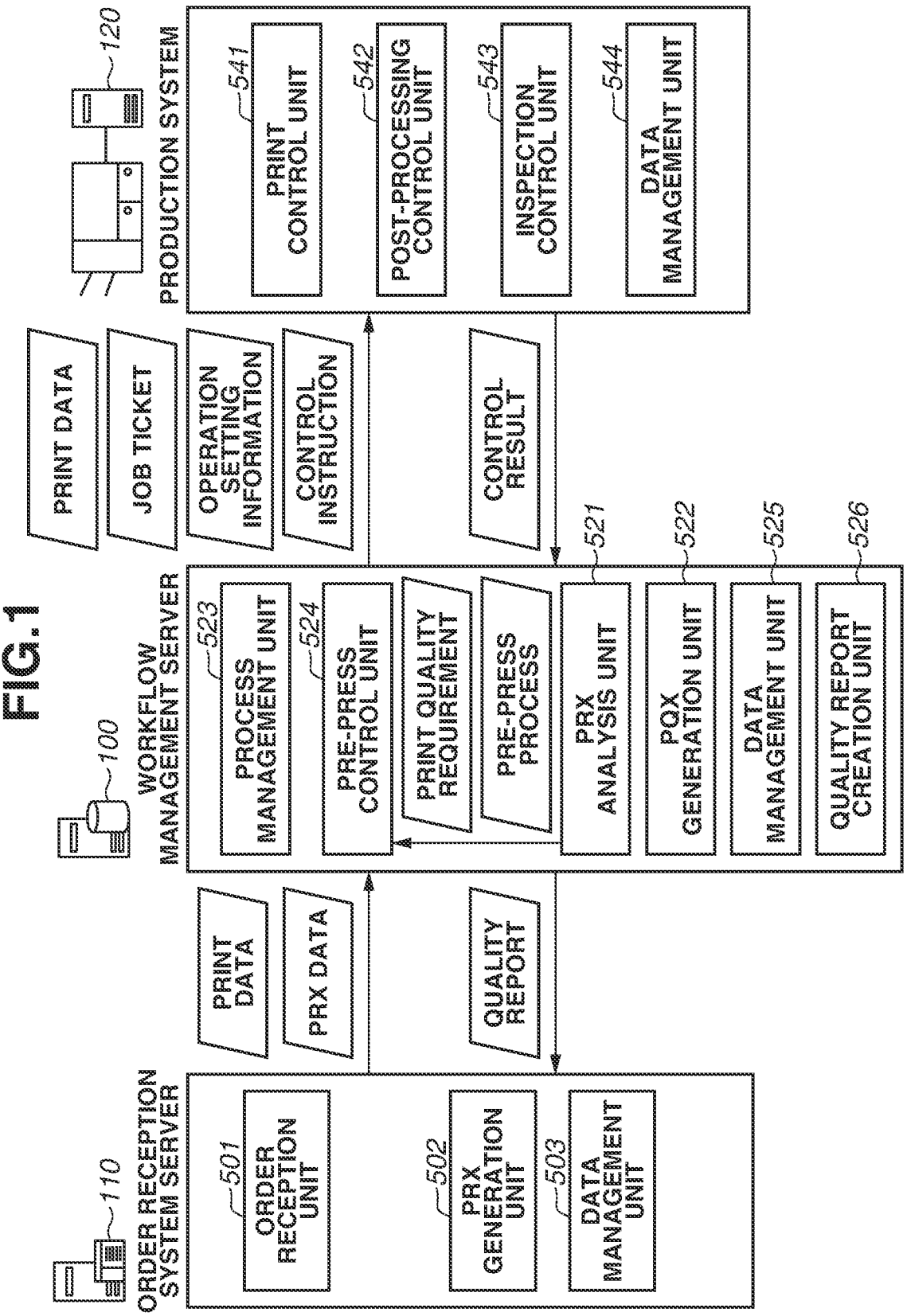
FIG. 1 is an overall schematic view according to an exemplary embodiment.

FIG. 1 is an overall schematic view illustrating an entire view of a printing system according to an exemplary embodiment of the present disclosure.

Details of roles of apparatuses and operations of the printing system will be described below with reference to FIG. 2 and the subsequent figures. In FIG. 1, each parallelogramic item represents data.

PRX data generated by an order reception system server 110 is analyzed by a PRX analysis unit 521 of a workflow management server 100. The workflow management server 100 is an example of an information processing apparatus. Then, print data, a job ticket, operation setting information, and a control instruction that are based on a result of the analysis are transmitted to a production system 120. The production system 120 is an example of a job processing apparatus.

The present exemplary embodiment is characterized in that the workflow management server 100 generates a target PQX item list while analyzing PRX data.

An order reception unit 501 to a data management unit 503, a PQX generation unit 522 to a quality report creation unit 526, and a print control unit 541 to a data management unit 544 will be described below and are thus will not be described in this section.

<Description of Entire System Configuration>

Figure 2:
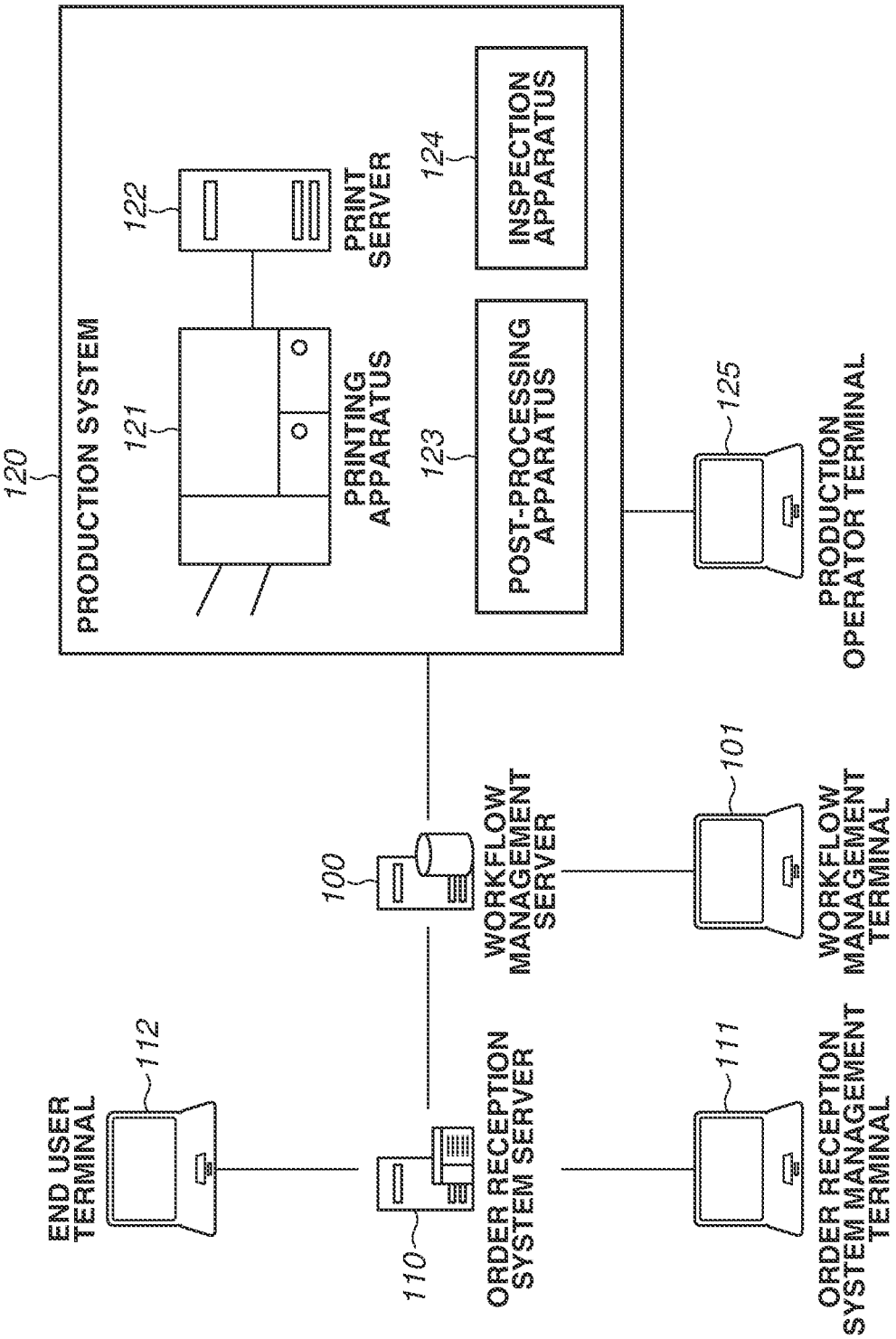
FIG. 2 is a conceptual diagram illustrating an entire configuration of a system according to an exemplary embodiment.

FIG. 2 is a diagram illustrating a configuration of a commercial printing system according to the present exemplary embodiment.

The workflow management server 100 is an apparatus that manages an entire workflow relating to a commercial printing product.

The workflow management server 100 receives PRX data, which is print data and quality condition information, from the order reception system server 110. Then, the workflow management server 100 analyzes the PRX data received from the order reception system server 110 and determines the production system 120 and executes a pre-press process on print data for each received order job. Then, a PQX item list is generated based on a result of analyzing the PRX data. Further, data (the print data, the job ticket, the operation setting information, and the control instruction in FIG. 1) to be processed by the production system 120 is generated, and the generated data is transmitted to each device of the production system 120. Each device of the production system 120 will be described below.

Then, various control results are received from the production system 120, and a quality report is created. The created quality report is transmitted to the order reception system server 110.

While the workflow management server 100 is described as an on-premises server installed at a workflow management site in the present exemplary embodiment, the workflow management server 100 is not limited to that described herein. According to another exemplary embodiment, the workflow management server 100 can be configured as a cloud server, and a workflow management terminal 101 described below can connect to the workflow management server 100 via the Internet. The same applies to the order reception system server 110 described below.

The workflow management terminal 101 is a terminal that is operated by a workflow administrator. The workflow management terminal 101 connects to the workflow management server 100 via a network and executes various functions. Specifically, the workflow management terminal 101 changes a workflow management function setting and verifies a state of a device of the production system 120.

The order reception system server 110 is an apparatus that manages a system for receiving an order for a commercial printing product from an end user. The order reception system server 110 generates print data and PRX data based on a product for which an order is received and based on details of an order from the end user, and transmits the generated print data and the generated PRX data to the workflow management server 100.

An order reception system management terminal 111 is a terminal that is operated by an order reception system administrator. The order reception system management terminal 111 connects to the order reception system server 110 via a network and executes various functions. Specifically, the order reception system management terminal 111 executes a function of setting a requested quality setting for each product, a function of verifying a status of each received order job, and a function of browsing quality information about a product for each received order job.

An end user terminal 112 is a terminal that is operated by the end user. The end user terminal 112 connects to the order reception system server 110 via a network. The end user terminal 112 receives a product selection instruction, a document data transmission instruction, and an order instruction from the end user via a user interface (UI) such as a web browser and transmits the received instructions to the order reception system server 110.

The production system 120 is a system that produces a commercial printing product (product) ordered by the end user. Specifically, the production system 120 includes apparatuses such as a printing apparatus 121, a print server 122 configured to control the printing apparatus 121, a post-processing apparatus 123, and an inspection apparatus 124.

The printing apparatus 121 and the print server 122 are connected via a network or a dedicated interface.

In the present exemplary embodiment, the post-processing apparatus 123 and the inspection apparatus 124 have a nearline configuration which connect to other devices via a network. The configurations of the post-processing apparatus 123 and the inspection apparatus 124 are not limited to the nearline configurations, and the post-processing apparatus 123 and the inspection apparatus 124 can have an off-line configuration which operates independently. In a case where the post-processing apparatus 123 and the inspection apparatus 124 have an off-line configurations, the post-processing apparatus 123 and the inspection apparatus 124 connect to an operation terminal (not illustrated) connectable to a network and connect to the network via the operation terminal. In any case, the post-processing apparatus 123 and the inspection apparatus 124 connect to the workflow management server 100 via the network and transmit and receive various types of information.

There is also a case where the production system 120 does not include one or some or all of the print server 122, the post-processing apparatus 123, and the inspection apparatus 124.

The printing apparatus 121 is an apparatus that executes a printing process based on data and an instruction from the workflow management server 100. A printing method is not particularly limited and can be an electrophotographic method, an inkjet method, or any other methods.

An administrator or an operator of the production system 120 can issue a printing control instruction via a UI of the printing apparatus 121.

The print server 122 is a server that controls the printing apparatus 121. As in a general printing system, an administrator or an operator of the production system 120 can issue a printing control instruction via a UI of the print server 122.

While the print server 122 includes a color management unit 545 described below in the present exemplary embodiment, the present exemplary embodiment is not limited to this configuration. For example, a color management server (not illustrated) connectable with the print server 122 and the printing apparatus 121 via the network can be separately installed to execute a color management process.

The post-processing apparatus 123 is an apparatus that performs post-processes on a printed sheet or a pile of sheets. Examples of post-processes include a process of creasing or folding a sheet and a process of cutting or bookbinding a pile of sheets.

The inspection apparatus 124 is an apparatus that detects defects in a final or intermediate product and executes a process of notifying a user and a process of removing the defective product from a production line.

A production operator terminal 125 is an apparatus that is used by an operator operating various devices of the production system 120. The production operator terminal 125 includes a function of verifying a device operation status and a function of verifying error information in a case where an error occurs. In another form, a UI operation unit of each device can bear the above-described functions instead of an external terminal.

<Description of Hardware Configuration>

Next, a hardware configuration of various apparatuses according to the present exemplary embodiment will be described below.

Figure 3:
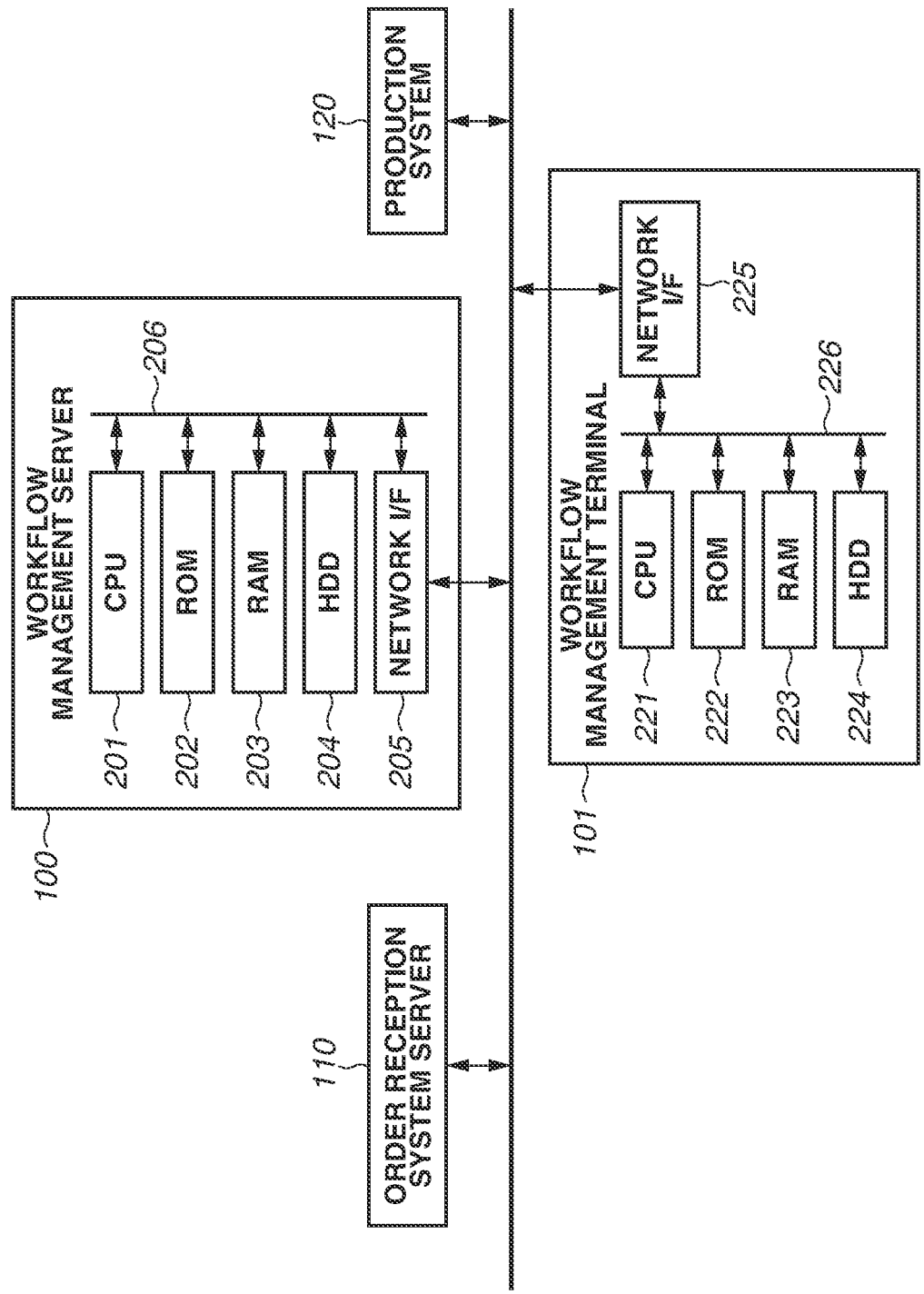
FIG. 3 is a block diagram illustrating a hardware configuration of a workflow management system according to an exemplary embodiment.

FIG. 3 is a block diagram illustrating a hardware configuration of a workflow management system including the workflow management server 100 and the workflow management terminal 101 according to the present exemplary embodiment.

First, a hardware configuration of the workflow management server 100 will be described below.

A central processing unit (CPU) 201 loads a control program stored in a read-only memory (ROM) 202 or a hard disk drive (HDD) 204 onto a random access memory (RAM) 203 and executes the program to comprehensively control access to various devices connected to a system bus 206. The ROM 202 stores control programs executable by the CPU 201. The RAM 203 mainly functions as a main memory of the CPU 201 and a work area, and the memory capacity of the RAM 203 is expandable by an optional RAM 203 connected to an expansion port (not illustrated). The HDD 204 stores a boot program, various applications, font data, user files, and edited files. While the HDD 204 is used in the present exemplary embodiment, a Secure Digital (SD) card or a flash memory other than an HDD can be used as an external storage apparatus. This also applies to the below-described apparatuses that include an HDD. A network interface (network I/F) 205 performs data communication with various apparatuses via the network.

The order reception system server 110 has a hardware configuration similar to that of the workflow management server 100, so that redundant descriptions thereof are omitted.

Next, a hardware configuration of the workflow management terminal 101 will be described below.

An inspection apparatus 221 loads a control program stored in a ROM 222 or an HDD 224 onto a RAM 223 and executes the program to comprehensively control access to various devices connected to a system bus 226. The ROM 222 stores control programs executable by the inspection apparatus 221. The RAM 223 mainly functions as a main memory of the inspection apparatus 221 and a work area, and the memory capacity of the RAM 223 is expandable by an optional RAM 223 connected to an expansion port (not illustrated). The HDD 224 stores a boot program, various applications, font data, user files, and edited files. A network I/F 225 performs data communication with other apparatuses via a network.

The other terminal apparatuses such as the order reception system management terminal 111, the end user terminal 112, and the production operator terminal 125 have a hardware configuration similar to that of the workflow management terminal 101, so that redundant descriptions thereof are omitted.

Figure 4:
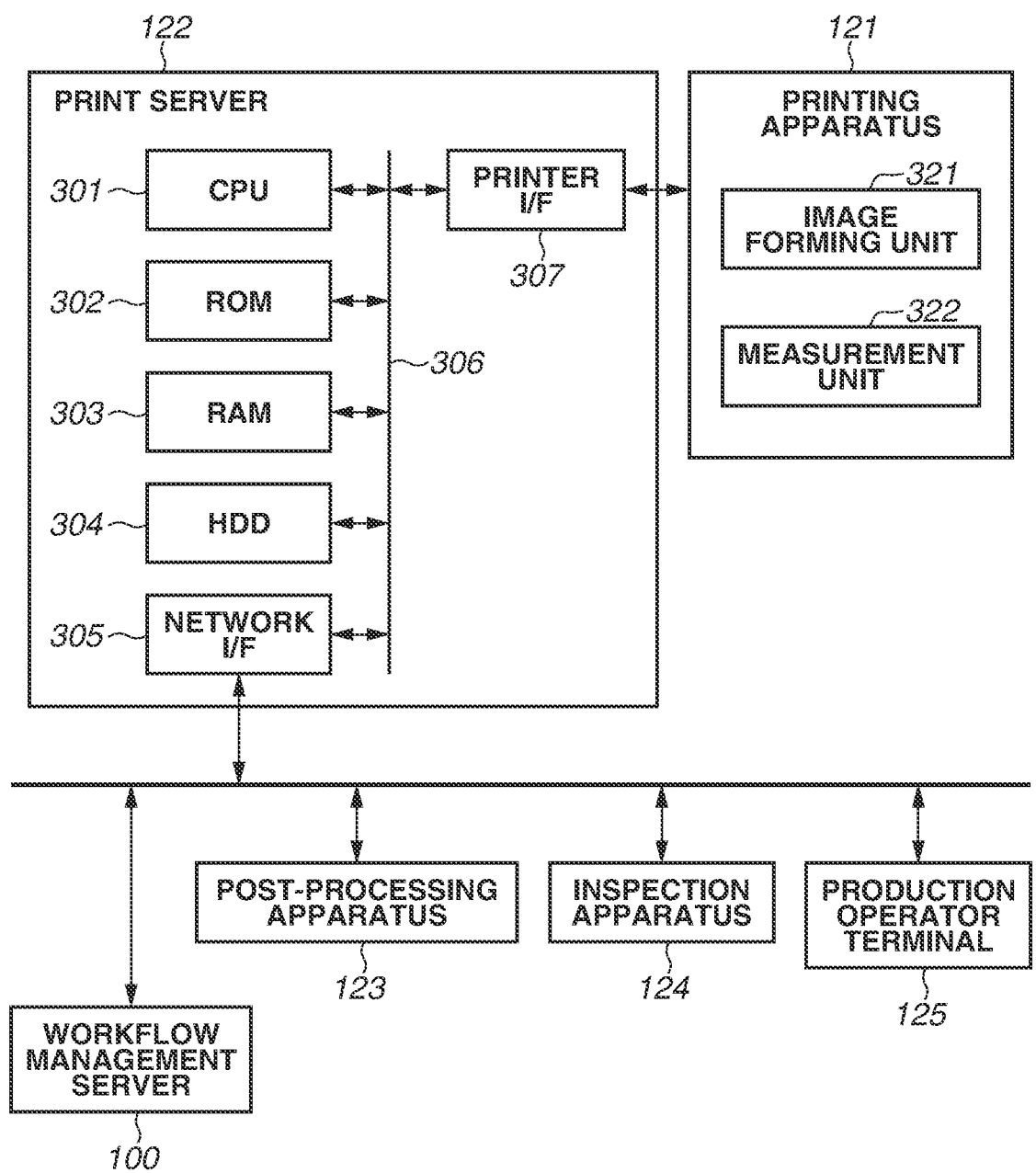
FIG. 4 is a block diagram illustrating a hardware configuration of a production system according to an exemplary embodiment.

FIG. 4 is a block diagram illustrating a hardware configuration of the production system 120 according to the present exemplary embodiment.

A CPU 301 loads a control program stored in a ROM 302 or an HDD 304 onto a RAM 303 and executes the program to comprehensively control access to various devices connected to a system bus 306. The ROM 302 stores control programs executable by the CPU 301. The RAM 303 mainly functions as a main memory of the CPU 301 and a work area, and the memory capacity of the RAM 303 is expandable by an optional RAM connected to an expansion port (not illustrated). The HDD 304 stores a boot program, various applications, font data, user files, and edited files. A network I/F 305 performs data communication with other apparatuses via a network.

A printer interface (printer I/F) 307 controls image output to an image forming unit 321 of the printing apparatus 121. Further, the printer I/F 307 controls a measurement unit 322 in the printing apparatus 121 and receives measurement results.

The printing apparatus 121 includes at least the image forming unit 321, which performs printing operations, and the measurement unit 322 described below. A sheet feeding apparatus (not illustrated) and an in-line post-processing apparatus (not illustrated) can further be connected to the printing apparatus 121.

The image forming unit 321 outputs print data onto a sheet. The image forming unit 321 has a hardware configuration similar to that of the printing apparatus 121 that is commonly used.

The measurement unit 322 measures a printed material generated by the image forming unit 321 based on an instruction from the print server 122 or an instruction from the printing apparatus 121. A measurement form is a known measurement form such as spectrophotometry, density measurement, charge-coupled device sensor (CCS) scanning, or contact image sensor (CIS) scanning. While the measurement unit 322 is provided in the printing apparatus 121 in the present exemplary embodiment, the present exemplary embodiment is not limited to this configuration. The measurement unit 322 can singly connect to a network independently of the printing apparatus 121. Alternatively, the measurement unit 322 can connect to an operation terminal (not illustrated) connectable to the network and connects to the network via the operation terminal. In any cases, the measurement unit 322 connects to the workflow management server 100 via the network and transmits and receives various types of information.

<Description of Software Configuration>

Next, software configurations of various apparatuses according to the present exemplary embodiment will be described below.

Figure 5A:
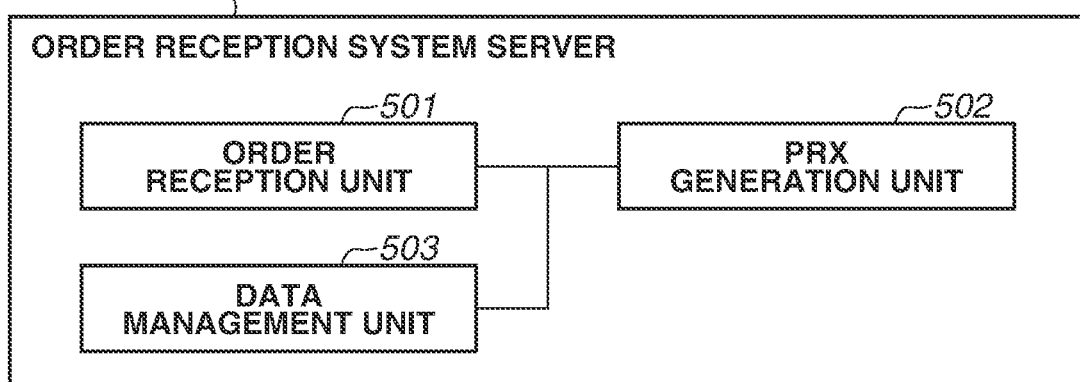
FIGS. 5A, 5B, and 5C are diagrams illustrating a software configuration according to an exemplary embodiment.

FIG. 5A is a block diagram illustrating a software configuration of the order reception system server 110 according to the present exemplary embodiment. Each software module is stored as a program in an HDD (not illustrated), and a CPU (not illustrated) loads the program onto a RAM (not illustrated) and executes the program to implement the software module.

The order reception unit 501 receives product order information from the end user terminal 112 via the network. The order information includes product type information, input image data, and quality request information. Portable Document Format (PDF) data is described as an example of input data in the present exemplary embodiment, but the present exemplary embodiment is not limited to this data format. Image data in another general format that can be interpreted by the production system 120 can be employed.

A PRX generation unit 502 analyzes the order information received from the order reception unit 501 and generates PRX data. Further, the PRX generation unit 502 transmits the generated PRX data to the workflow management server 100.

The data management unit 503 records information such as the order information and the PRX data. Further, the data management unit 503 transmits the input image data, the product type information, and the PRX data to the workflow management server 100. The data management unit 503 further transmits and receives other data to and from various apparatuses. In the order reception system, a quality report generated based on the PQX data received by the data management unit 503 is displayed on the order reception unit 501. The end user reviews a quality condition based on the PQX data displayed on the order reception unit 501. The end user compares the quality conditions of the production system 120 and a printed material based on not-good (NG) data (information about the production system 120 and a measurement value) of the PQX data and selects an optimum combination of cost and quality.

Figure 5B:
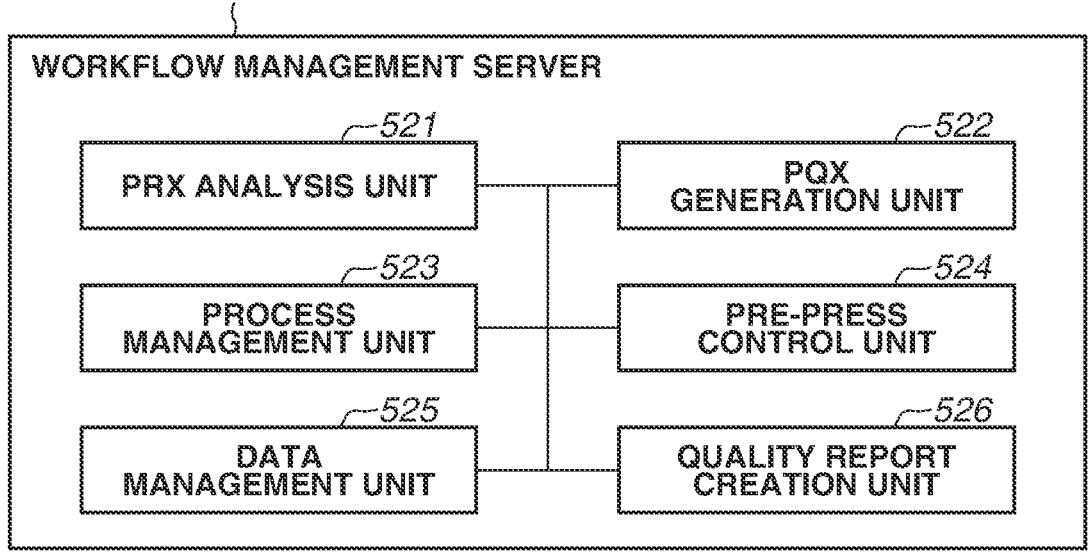

FIG. 5B is a block diagram illustrating a software configuration of the workflow management server 100 according to the present exemplary embodiment. Each software module is stored as a program in the HDD 204, and the CPU 201 loads the program onto the RAM 203 and executes the program to implement the software module.

The PRX analysis unit 521 analyzes the PRX data received from the order reception system server 110 and identifies a print quality requirement and a part of a necessary pre-press process. For example, the print quality requirement is that an average color difference obtained from measurement results of a predetermined color patch falls within a specific criterion.

Further, the pre-press process is, for example, a process of adding the color patch image to a blank space of image data which becomes a color measurement target in a color quality verification process.

Furthermore, the PRX analysis unit 521 transmits analysis result information to the PQX generation unit 522. The analysis result information refers to item information about the print quality requirement specified by PRX.

The PQX generation unit 522 creates a list of necessary PQX items for a target print job based on the PRX analysis result information transmitted from the PRX analysis unit 521. Details thereof will be described below.

Furthermore, the PQX generation unit 522 stores information about results of quality verification executed based on an instruction from a process management unit 523 to the production system 120 in the generated PQX item.

The process management unit 523 selects the production system 120 and executes an instruction to a pre-press control unit 524 using the product type information received from the order reception system server 110 and the analysis result information from the PRX analysis unit 521.

The selecting of the production system 120 will be described below with reference to step S616 in FIG. 6.

Further, the process management unit 523 generates job ticket data to which the printing apparatus 121 of the production system 120 refers. While known Job Definition Format (JDF) data is used as job ticket data in the present exemplary embodiment, the present exemplary embodiment is not limited to this data. Another known job ticket data format that can be interpreted by the production system 120 can be used.

Further, the process management unit 523 refers to PRX information and generates operation setting information about the post-processing apparatus 123 and the inspection apparatus 124.

Furthermore, the process management unit 523 transmits the PDF data and the JDF data having undergone the pre-press process described below and the operation setting information about the devices to the production system 120.

The pre-press control unit 524 executes the pre-press process on the input image data based on an instruction from the process management unit 523 and transmits the processed PDF data to the process management unit 523.

A data management unit 525 receives the print data and the PRX data from the order reception system server 110. The data management unit 525 transmits the PDF data, the JDF data, and information about instructions to various apparatuses of the production system 120 to the production system 120. Further, the data management unit 525 receives control result data from the production system 120. Further, the data management system 525 transmits a quality report to the order reception system server 110. Further, the data management unit 525 transmits and receives other data to and from various apparatuses.

The quality report creation unit 526 creates a quality report to be transmitted to the order reception system server 110 based on the PQX data generated by the PQX generation unit 522.

Figure 5C:
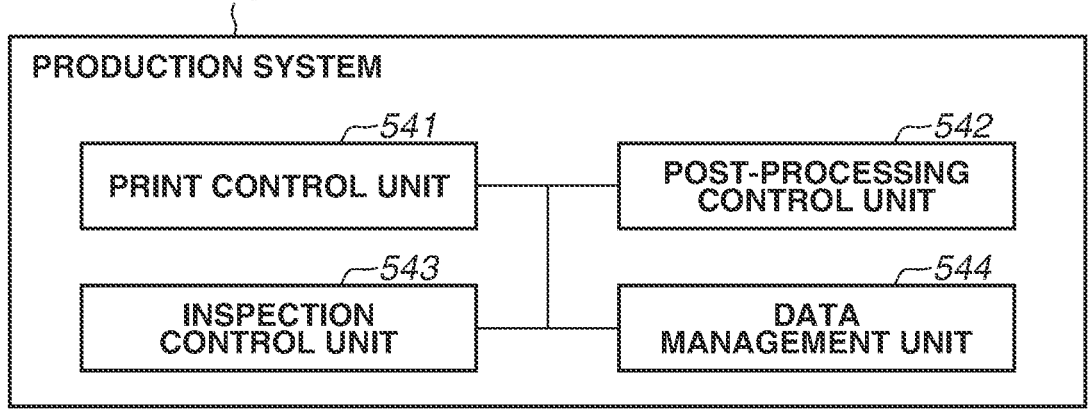

FIG. 5C is a block diagram illustrating a software configuration of the production system 120 according to the present exemplary embodiment. Each software module is stored as a program in the HDD 304 of various devices of the production system 120, and the CPU 301 loads the program onto the RAM 303 and executes the program to implement the software module. The production system 120 includes the printing apparatus 121, the print server 122, the post-processing apparatus 123, and the inspection apparatus 124, and in the present exemplary embodiment, the foregoing four pieces of hardware will be considered as a single piece of hardware, i.e., the production system 120.

The print control unit 541 controls printing using the information (PDF, JDF) received from the workflow management server 100. Further, the print control unit 541 also includes an adjustment function of adjusting print quality and executes the adjustment function based on a control instruction received from the workflow management server 100, the print server 122, or the production operator terminal 125.

The data management unit 544 transmits control result information about various devices of the production system 120 to the workflow management server 100. Furthermore, the data management unit 544 transmits and receives other data to and from various apparatuses. Alternatively, each device can include the data management unit 544.

A post-processing control unit 542 controls the post-process of the post-processing apparatus 123 based on a control instruction received from the workflow management server 100.

An inspection control unit 543 controls the inspection of the inspection apparatus 124 based on a control instruction received from the workflow management server 100.

The inspection control unit 543 compares image data read by a sensor in the inspection apparatus 124 with reference image data. As a result of the comparison, in a case where a difference greater than a predetermined allowable range is detected, the inspection control unit 543 performs predetermined control. Specifically, the inspection control unit 543 identifies the inspection target as a defect, transmits the result to the workflow management server 100 via the data management unit 544, and notifies the user of the result.

<Description of PRX Configuration>

Configurations of PRX and PQX used in the present disclosure will be described below.

Figure 11:
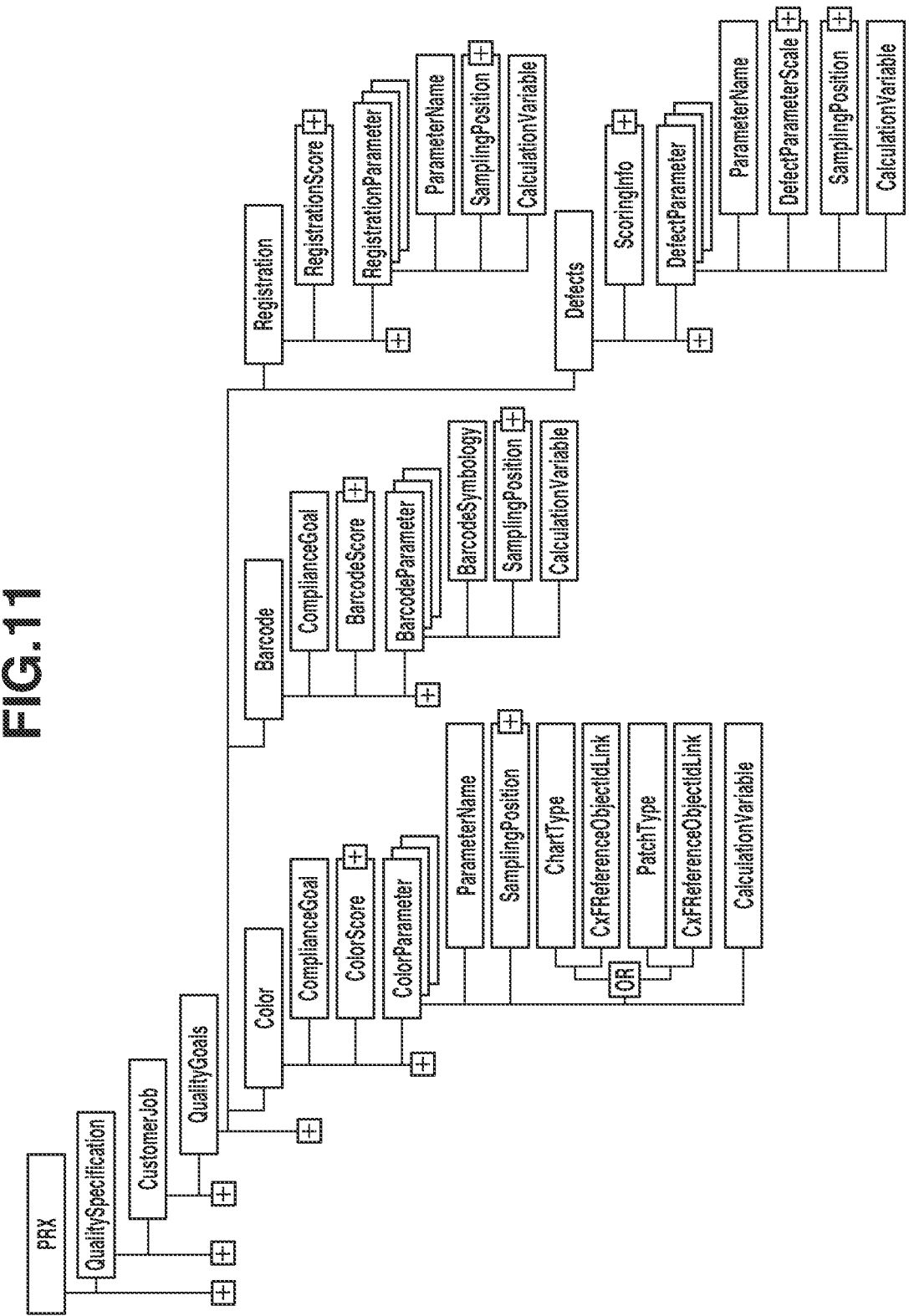
FIG. 11 is a diagram illustrating an example of a PRX configuration.

FIG. 11 is a diagram illustrating an example of PRX configuration information according to the present exemplary embodiment. Only items that mainly relate to the present disclosure are illustrated. Illustrated parameters and relationships between the parameters are mere examples, and there can be another item or configuration that represents information held by each parameter.

PRX is, for example, data described in an Extensible Markup Language (XML) text format, and there is normally one pieces of PRX data associated with print data. PRX contains information about various quality demands and requests from the client and is referred to as quality request data.

A Quality Specification item is a PRX element and contains quality goals for evaluation items and information about evaluation criteria.

A Customer Job item is a Quality Specification element and contains information about a print job with respect to a request quality item.

A Quality Goals item is a Customer Job element and contains information about a print quality target specified by a client. There are four print quality items that are Color, Barcode, Registration, and Defects.

A Color item is a Quality Goals element and contains information for use in a case where the request quality specified by the client is color. The Color item includes a Compliance Goal item, which describes a request quality target, a Color Score item, which describes a definition of a target color and a request level of the target color, and a Color Parameter item, which will be described below.

The Color Parameter item is a Color element and describes detailed color patch information. For a case where there are demands for a plurality of colors in a single product, a plurality of pieces of the Color Parameter item can be described simultaneously. The Color Parameter item contains the Parameter Name parameter, a Sampling Position parameter, a Patch Type or Chart Type parameter, and a CxF Reference Object Id Link parameter. The Parameter Name parameter describes a parameter name. The Sampling Position parameter describes location information about a target color drawn in print data. The Patch Type parameter is described in a case of a single target color, or the Chart Type parameter is described in a case of a plurality of patches. The CxF Reference Object Id Link parameter describes link information about a link to patch signal value information.

The Barcode item is a Quality Goals element and contains information for use in a case where the request quality specified by the client is a barcode printed in a product. The Barcode item has a configuration similar to that of the Color element and contains a Barcode Score item and a Barcode Parameter item describing barcode information.

The Registration item is a Quality Goals element and contains information for use in a case where the request quality specified by the client is a registration such as a color shift. The Registration item has a configuration similar to that of the Color element and contains a Registration Score item and a Registration Parameter item describing information about a color shift and a print shift of front and back sides.

Defects is a Quality Goals element and contains information for use in a case where the request quality specified by the client is a printing failure. The printing failure is a state where a printing result is not as expected, and examples are stain, missing print, and faint print caused by a toner leakage or defective fixing. The client expects and demands that printing is executed always without failures. So, this element is used in a case where the client demands a high quality request for verification with extra care. A Scoring Info item, which describes request level information, and a Defect Parameter item, which describes detailed information about image defects, are contained.

<Description of PQX Configuration>

Figure 12:
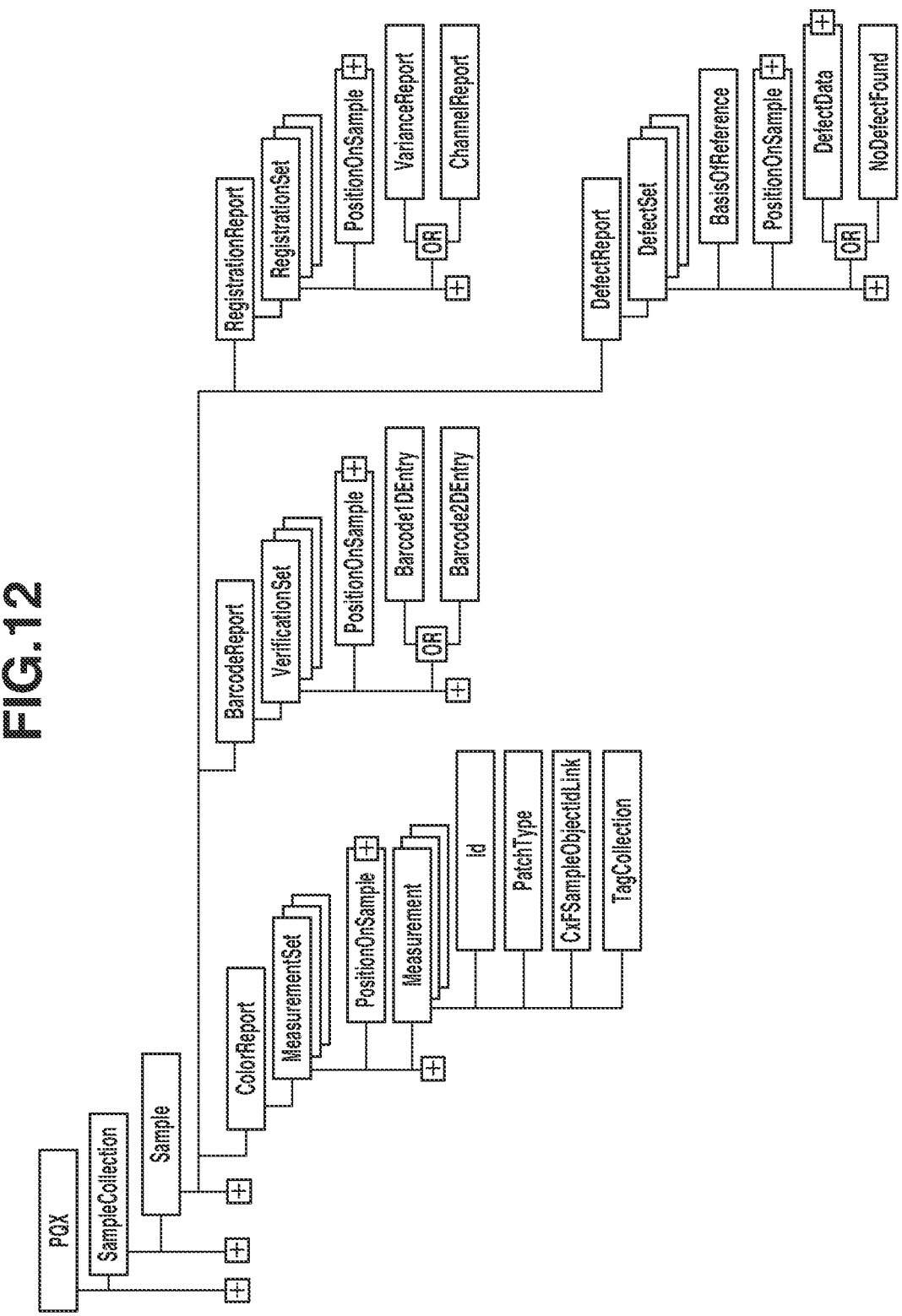
FIG. 12 is a diagram illustrating an example of a PQX configuration.

FIG. 12 is a diagram illustrating an example of PQX configuration information according to the present exemplary embodiment. Only items that mainly relate to the present disclosure are illustrated. The illustrated parameters and relationships between the parameters are mere examples, and there can be another item or configuration that represents information held by each parameter.

PQX is, for example, data described in an XML text format, and there is normally one piece of PQX data associated with a printed product of print data. PQX contains information about a quality state of the printed product and is referred to as product quality data.

A Sample Collection item is a PQX element and contains quality result information with respect to an evaluation item.

Sample is a Sample Collection element and contains information about actual performance in generating a product with respect to an evaluation item specified by the client. Four items that are a Color Report item, a Barcode Report item, a Registration Report item, and a Defect Report item are contained as print quality items describing actual performance.

The Color Report item is a Sample element and contains information about color-related quality actual performance. The Color Report item contains a Measurement Set item describing color patch measurement result information.

The Measurement Set item is a Color Report element and contains a Position On Sample item and a Measurement item. The Position On Sample item describes position information about a measured color patch. The Measurement describes measurement result information about the measured color patch.

The Measurement is a Measurement Set element and contains a color patch ID item, the Patch Type parameter, a CxF Sample Object Id Link item, which describes link information about a link to the measurement result information, and a Tag Collection item.

The Barcode Report item is a Sample element and contains information about barcode-related quality actual performance. A Verification Set item, which describes information about a verification result of a barcode quality level, is contained.

The Registration Report item is a Sample element and contains information about registration-related quality actual performance. A Registration Set item, which describes information about a verification result of a registration quality level, is contained.

The Defect Report item is a Sample element and contains a Defect Set item, which describes information about a printing failure verified by an inspection process.

<Description of Sequence of Software Process>

FIG. 6 is a sequence diagram illustrating a software process according to an exemplary embodiment.

In step S601, the order reception unit 501 of the order reception system server 110 receives an order from the end user. The received order is a PDF as print data and product request information and is received via an operation unit (not illustrated) of the order reception system server 110.

In step S602, the PRX generation unit 502 generates PRX from the received print data and the received product request information.

For example, in a case where a photobook is ordered by the end user, a request for colors is expected. There may be a request for a beautifully-output skin of a person arranged on a desired page and a request for adjusting the colors of an entire product to Japan Color®, which is one of the standard color spaces. The PRX generation unit 502 receives the requests and generates PRX. Specifically, a Color parameter in the PRX Color element is generated. In a case of a request relating to a skin of a person, a name indicating a request target, such as "Baby Cheek", is recorded in a Parameter Name parameter to generate a Color Parameter item. Further, location information about the request target is recorded in the Sampling Position parameter, and target colors information is recorded in the CxF Reference Object Id Link parameter, whereby the Color Parameter item is generated. Further, in a case of a request for an adjustment to Japan Color®, the character string "Japan Color®" is recorded in the Parameter Name parameter. Then, a print position of patches for color verification is recorded in the Sampling Position parameter, and information about target colors for patches that are defined by Japan Color® is recorded in the CxF Reference Object Id Link parameter.

The print data and the PRX data are transmitted to the workflow management server 100 via the data management unit 503.

After the workflow management server 100 receives the print data and the PRX data via the data management unit 525, in step S603, the PRX analysis unit 521 analyzes the received PRX data. A result of the analysis is stored in the data management unit 525 as a database as illustrated in FIG. 8. Further, a part of a necessary process for the pre-press operation is identified from the analyzed PRX data.

FIG. 8 is a diagram illustrating an example of a database of analyzed PRX data. The data is generated by the PRX analysis unit 521 and stored in the data management unit 525. The number of pieces of data that corresponds to the number of quality items requested by the end user are generated. A parameter 801 is information indicating which one of the four types of quality items Color, Barcode, Registration, and Defect corresponds. A parameter 802 is information about a name given to the item. A parameter 803 is information about a location of the item. Parameters 804 and 805 are parameters for a case where an item is a color item. The parameter 804 is information indicating whether the target color consists of a single patch a plurality of patches. A parameter 805 is information about colors to be achieved for the target colors. As a matter of configuration, actual colors information is recorded in another area, and the parameter 805 is information about a link to the recorded information. A parameter 806 is information indicating a quality level requested by the end user. For example, for the Color item, the parameter 806 is the numerical value "dE00" indicating the color difference between the target and the measured value. Further, the parameter 806 differs depending on the item. For the Barcode item, the parameter 806 is a value indicating that a result verified by a method stipulated by the International Organization for Standardization (ISO) is a pass. For the Registration item, the parameter 806 is a numerical value indicating an amount of misregistration.

In step S616, the process management unit 523 of the workflow management server 100 selects the production system 120 that satisfies the quality condition for the PRX data from production systems 120 registered via a production system setting screen (not illustrated). An operator of a printing company having a quality management system sets production systems 120 used by the printing company to the process management unit 523 via the production system setting screen (not illustrated) of the workflow management server 100.

The process management unit 523 selects a production system 120 capable of printing from the items of the database of PRX data. The process management unit 523 selects whether a color value (L*a*b) set for the PRX data is within the color gamut of the production system 120 and whether two-sided printing is executable in a case where a front/back registration quality condition is set for the PRX data from the set production systems 120.

Figure 10:
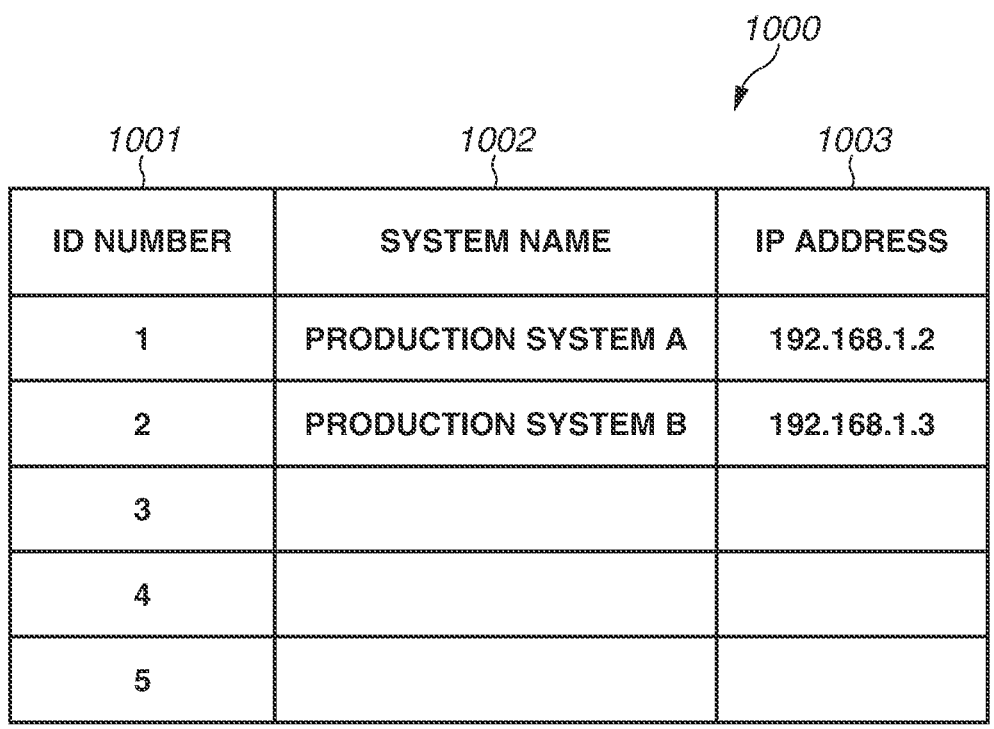
FIG. 10 is a diagram illustrating an example of a production system database selected by a process management unit according to an exemplary embodiment.

In a case where a plurality of production systems 120 is selected, the process management unit 523 manages the selected production systems 120 using the data management unit 525. FIG. 10 is a diagram illustrating an example of a case where each production system 120 selected by the process management unit 523 is managed with an ID number assigned to the selected production system 120. The data management unit 525 assigns an ID number 1001 to each system name 1002 and manages the system name 1002 together with information such as an Internet Protocol (IP) address 1003 that is a transmission destination of print data such as a JDF.

The process management unit 523 creates a JDF and work instruction sheet data for the production system 120 selected based on the PRX and inputs the created JDF and the created work instruction sheet data to the production system 120. As described below in the descriptions of step S610, in a case where the selected production system 120 satisfies the quality condition via PRX, the PQX generation unit 522 stores product verification data (PQX) in PQX. In a case where the quality condition is not satisfied, the process management unit 523 changes and selects a next production system 120 sequentially from the selected production systems 120 based on a production system database 1000 of the data management unit 525. Then, the process management unit 523 creates a JDF and work instruction sheet data for the selected production system 120 and inputs the created JDF and the created work instruction sheet data to the production system 120.

In subsequent step S604, the pre-press control unit 524 executes a necessary pre-press process from the PRX data analyzed in step S603. In an example of the pre-press process, in a case where patch information is recorded in the Color item, a color patch image is generated based on the patch information, and the generated color patch image is placed in a blank space of the print data. In another example of the pre-press process, in a case where information is recorded in the Registration item, a mark image for detecting four colors and an amount of misregistration between the front and the back is generated, and the generated mark image is placed in a blank space of the print data.

In step S605, the process management unit 523 generates a JDF and a work instruction sheet from the print data and the PRX data analyzed in step S603. The JDF is a job ticket that records a bookbinding setting and a finishing setting for the print data and a post-process setting of a post-process to be executed by the post-processing apparatus 123. Further, the process management unit 523 sets an instruction to measure the color patch image and the registration mark image that are generated in step S604 to the JDF. The print data PDF and the generated JDF are transmitted to the production system 120 selected in step S616.

Further, there is also a case where an instruction that is settable using a JDF is partially expressed in a work instruction sheet format. The work instruction sheet is information indicating an operation instruction that specifies an operation to be executed by a print operator. For example, quality verification operations such as patch image measurement, barcode verification, and inspection cannot be executed automatically depending on the configuration of the production system 120 and thus need to be performed off-line by the operator. In this environment, a work instruction sheet is generated, and the print operator is notified of necessary operations to execute the print process.

In subsequent step S606, the PQX generation unit 522 generates a PQX list based on the PRX analysis result obtained in step S603. As used herein, the term "PQX list" refers to a list of information representing a quality result for a product of a target print job for each item unit of the PQX format. The generating of the PQX list will be described below with reference to FIG. 7.

FIG. 7 is a flowchart illustrating a process of generating a PQX list according to the present exemplary embodiment. The flowchart is stored as a program in the HDD 204, and the CPU 201 loads the program onto the RAM 203 and executes the program to implement the flowchart. The flowchart is started when the PQX generation unit 522 is changed to a state where the PQX generation unit 522 can acquire the PRX data stored in the PRX analysis in step S603.

In step S701, the PQX generation unit 522 selects the PRX that is analyzed for the target print job.

In step S702, the PQX generation unit 522 determines whether quality data is in the PRX. For example, each row of the PRX data in FIG. 8 corresponds to a piece of quality data.

In a case where the PQX generation unit 522 determines that there is a PRX item (YES in step S702), in subsequent step S703, the PQX generation unit 522 selects the first PRX item (quality item).

In step S704, the PQX generation unit 522 generates an item for one quality report to be generated in the PQX format with respect to the selected one quality item.

The generated PQX data will be described below with reference to FIG. 9. FIG. 9 is a diagram illustrating an example of a PQX database created in the present exemplary embodiment. The data is generated by the PQX generation unit 522 and stored in the data management unit 525.

A parameter 901 is information indicating which one of the four types of quality items Color, Barcode, Registration, and Defect the report is about. The parameter 901 is generated as information corresponding to the PRX data 801. A parameter 902 is information about a name of the item. The parameter 902 is generated as information corresponding to the PRX data 802. A parameter 903 is information about a location of the item. The parameter 903 is generated as information corresponding to the PRX data 803. A parameter 904 is information about a result of the item. The information has no value at the time when the PQX list is generated. During the printing process described below, data (measurement value) is acquired, and the result is recorded in the parameter 904.

As described above, the PQX items are generated based on the items recorded in the PRX data.

In step S705, the PQX generation unit 522 determines whether all the PRX items have been processed.

In a case where there is an unprocessed PRX item (NO in step S705), the processing proceeds to step S706, and the PQX generation unit 522 selects a next PRX item. Then, the PQX generation unit 522 executes step S704 on the selected PRX item.

In a case where all the PRX items have been processed (YES in step S705), the processing proceeds to step S707, and the PQX generation unit 522 determines all the generated PQX items as a PQX list.

In step S702, in a case where there is not a PRX item (NO step S702), the processing proceeds to step S708. In step S708, the PQX generation unit 522 generates a blank PQX list, and the processing proceeds to step S707.

By executing the foregoing process, the PQX generation unit 522 generates the PQX list in the PQX list generation in step S606.

Further, the PQX list generated herein is generated by analyzing the PRX, so that items that are not described in the PRX do not exist as items of the PQX list.

While the PQX list is created correspondingly to the quality items contained in the PRX data in present exemplary embodiment, the present exemplary embodiment is not limited to that described herein. Alternatively, the system can hold a predetermined PQX list without reference, and PQX data can be generated from the PQX list.

In step S607, the print control unit 541 of the production system 120 prints the print data received from the workflow management server 100. The print control unit 541 performs RIP processing on the received PDF data using the print server 122, executes a halftone process on the PDF data using the printing apparatus 121, and executes printing. Further, the post-processing control unit 542 executes a post-process as needed using the post-processing apparatus 123 based on JDF data setting information.

In step S608, the print control unit 541 analyzes the JDF data and determines whether the JDF data contains a color patch measurement instruction, which is an example of a quality verification instruction. In a case where the JDF data does not contain a color patch measurement instruction (NO in step S608), the patch measurement process is skipped, and the processing proceeds to the next.

In a case where the JDF data contains a patch or mark measurement instruction (YES in step S608), in step S609, the print control unit 541 measures a target color patch. The print control unit 541 controls the measurement unit 322 of the printing apparatus 121 and reads a color value of the patch using a sensor. In general, the color value to be read is, for example, density data or L*a*b* color value. After the color value of the patch is measured, the data management unit 544 of the production system 120 transmits the acquired measurement results to the workflow management server 100. The number of patches to be measured is not limited to one and can be more than one.

After the data management unit 525 of the workflow management server 100 receives the information about the measured color value of the patch from the production system 120, in step S610, the data management unit 525 compares the received information with the quality condition and stores a result of the comparison in the PQX database. In the present exemplary embodiment, the measurement result is recorded in the PQX data 904. Details thereof will be described below with reference to FIG. 13.

In step S611, the inspection control unit 543 of the production system 120 analyzes the JDF data and determines whether an inspection instruction, which is an example of a quality verification instruction, is contained. An inspection instruction is, for example, an inspection of whether there is a printing error designated by the Defect item in the PRX.

In step S612, the inspection control unit 543 executes an inspection process using the inspection apparatus 124. In the examples of the inspection of whether there is a printing error, the inspection apparatus 124 captures an image of each page of the printed product with a camera (not illustrated) and compares the captured image with a pre-registered correct image, and in a case where an unmatching portion is detected, it is determined that there is a printing error. The inspection control unit 543 automatically transmits the inspection result from the inspection apparatus 124 to the production system 120. Further, the operator can visually verify whether there is a printing error using the work instruction sheet. In this case, for example, the operator transmits a notification of the printing result to the workflow management server 100 through the production operator terminal 125.

In step S613, after receiving an inspection result from the production system 120, the data management unit 525 of the workflow management server 100 stores the result in the PQX database. In the present exemplary embodiment, the measurement result (measurement value) is recorded in the PQX data 904.

In step S617, the PQX generation unit 522 determines whether the measurement result and the inspection result of all the production systems 120 selected by the process management unit 523 are stored in the PQX database.

In a case where the measurement result and the inspection result of all the production systems 120 selected by the process management unit 523 are stored in the PQX database (YES in step S617), the processing proceeds to step S614.

In a case where not all the measurement results of the production systems 120 that are stored in the production system database 1000 are stored in the PQX database (NO in step S617), the processing proceeds to step S616. In step S616, the process management unit 523 creates a JDF and work instruction sheet data for the production system 120 selected by the process management unit 523 based on the production system database 1000 and inputs the created JDF and the created work instruction sheet data to the production system 120.

In subsequent step S614, the quality report creation unit 526 of the workflow management server 100 creates a quality report. The quality report is, for example, PQX data documented in a format that is easy to check for the system administrator and the end user. In general, one quality report is generated together with a product for a job ordered by the end user. The quality report creation unit 526 transmits the created quality report to the order reception system server 110 via the data management unit 525.

In step S615, the data management unit 503 of the order reception system server 110 stores the quality report received from the workflow management server 100. The stored quality report can be verified by the system administrator or the end user via the terminals 111 and 112.

<Operation of Storing Measurement Result (Measurement Value) (step S610)>

Figure 13:
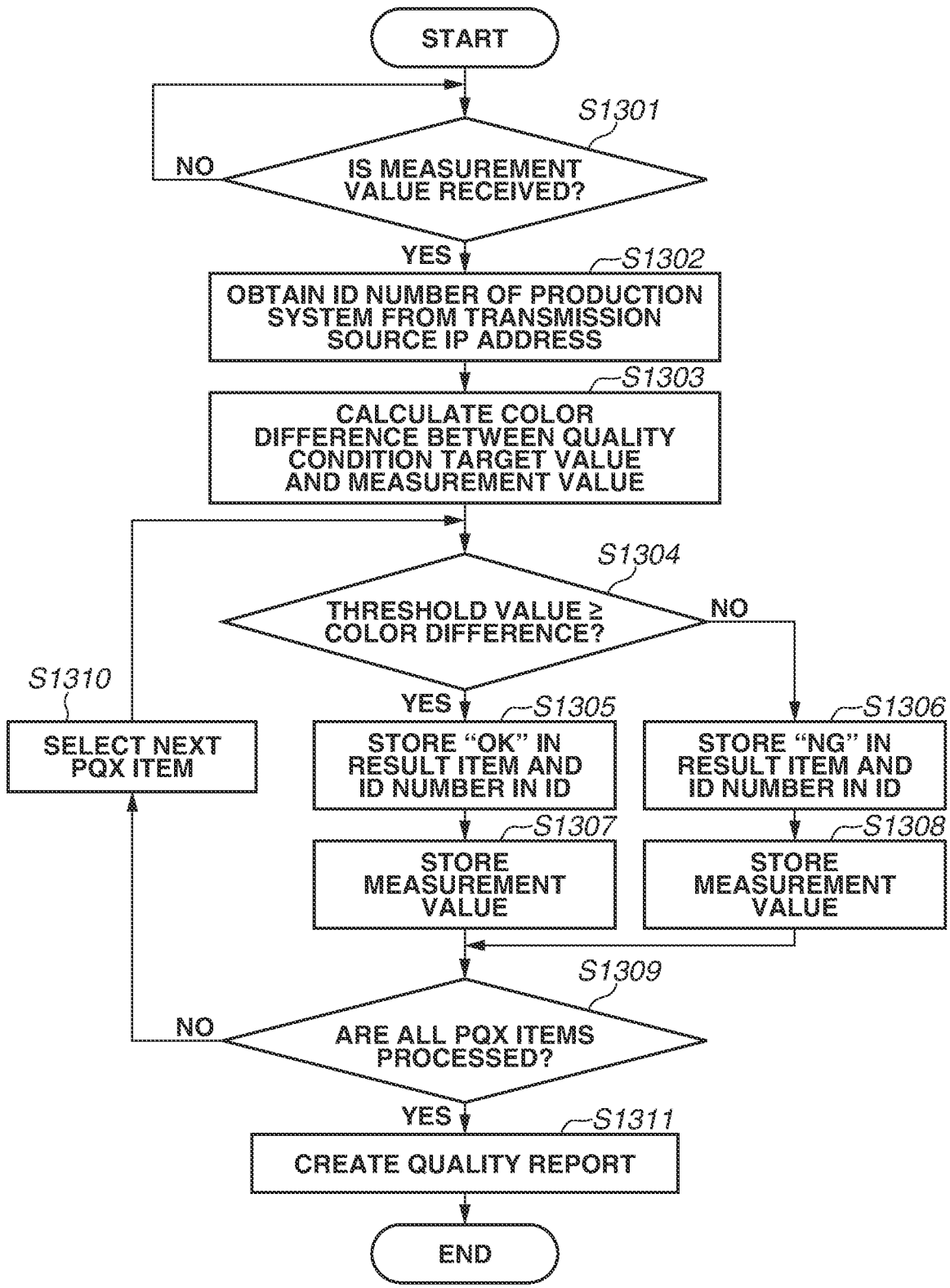
FIG. 13 is a flowchart illustrating a PQX software process.

FIG. 13 is a flowchart illustrating a process of generating PQX data according to the present exemplary embodiment. The flowchart is stored as a program in the HDD 204, and the CPU 201 loads the program onto the RAM 203 and executes the program to implement the flowchart. The flowchart is started if the PQX generation unit 522 is changed to a state where the PQX generation unit 522 can receive a measurement value from the production system 120.

In step S1301, the PQX generation unit 522 waits for a measurement value. In a case where there is a measurement value transmitted from the production system 120 via the network (YES in step S1301), the processing proceeds to step S1302. In step S1302, the PQX generation unit 522 obtains an ID number 1001 of the production system 120 by searching the production system database 1000 for a transmission source IP address. In step S1303, the PQX generation unit 522 calculates a color difference between a quality condition target value ($L^*a^*b$) and a measurement value ($L^*a^*b$). In step S1304, the PQX generation unit 522 compares a threshold value of the quality condition and the color difference calculated in step S1303. In a case where the threshold value is greater than or equal to the color difference (YES in step S1304), in step S1305, the PQX generation unit 522 stores the character string "OK" in the Result item and the ID number in the ID item in the PQX data. Then, in step S1307, the measurement value is stored in the PQX database. In a case where the threshold value is less than the color difference (NO in step S1304), the processing proceeds to step 1306. In step S1306, the PQX generation unit 522 stores the character string "NG" in the Result item and ID number of the selected production system 120 in the ID item in the PQX data. Then, in step S1308, the PQX generation unit 522 stores the measurement value "NG" in the PQX database. Then, in step S1309, the PQX generation unit 522 determines whether all the PQX items contained in the PQX list obtained from the quality condition (PRX) have been processed. In a case where not all the PQX items have been obtained from the production system 120 (NO in step S1309), the processing proceeds to step S1310. In step S1310, the PQX generation unit 522 selects a next PQX item.

In a case where all the PQX items received from the production system 120 have been processed (YES in step S1309), the processing proceeds to step S1311. In step S1311, since it is determined that all the necessary quality verification results for the PQX items have been recorded, the quality report creation unit 526 creates a quality report and transmits the created quality report to the order reception system server 110.

The order reception system server 110 stores the quality report received from the workflow management server 100. The stored quality report can be displayed on a display unit of the order reception system server 110, and the operator of the order reception system server 110 can check the content of the displayed quality report.

In the example illustrated in FIG. 13, in step S1306, the PQX generation unit 522 stores the character string "NG" in the Result item and the ID number of the selected production system 120 in the ID item in the PQX data. Then, in step S1308, the measurement value "NG" is stored in the PQX database. The present disclosure is not limited to this example. Alternatively, in step S1308, the PQX generation unit 522 can store the value of a difference between the quality requested in the PRX data and the measured quality so that the operator of the order reception system server 110 can check the value of the difference.

As described above, according to the present exemplary embodiment, the process management unit 523 sequentially transmits the JDF and the work instruction sheet data to the plurality of production systems 120 selected from the PRX (quality condition). Consequently, not only the quality verification data (measurement value) that satisfies the quality condition but also the quality verification data that is determined as not satisfying the quality condition are provided to the product verification data (PQX).

This enables the end user to recognize the difference between the quality condition and the measurement value of the production system 120 based on the product verification data via an order reception system of the quality management system.

This solves the case where printing with an offset device is the only option when emphasis is placed on the quality condition although an inexpensive print-on-demand (POD) device is available if the quality condition is re-adjusted.

According to the above-described exemplary embodiment, not only the quality verification data (measurement value) of the product verification data that satisfies the quality condition but also the quality verification data (measurement value) determined as not satisfying the quality request are provided, so that the end user can re-adjust the quality condition.

The end user can print using an inexpensive POD device by re-adjusting the quality condition.

This produces an advantage of a wider range of choices of combinations of product cost and product quality that are selectable by the end user.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-104669, filed Jun. 17, 2020, which is hereby incorporated by reference herein in its entirety.

What is claimed is:

1. An information processing apparatus comprising:
one or more processors; and
at least one memory storing instructions executable by the one or more processors to cause the information processing apparatus to:
receive print data and quality request data including information indicating a requested quality of a print product to be printed based on the print data;
transmit the print data and an instruction based on the quality request data to a production system;
generate items of a quality report based on the quality request data;
receive, from the production system, information about a print product printed based on the print data by the production system, the information about the print product being generated based on the instruction;
determine, based on the information about the print product and the information indicating the requested quality, whether a detected quality of the print product printed based on the print data by the production system satisfies the requested quality; and
notify, in a case where the detected quality of the print product printed based on the print data by the production system does not satisfy the requested quality, a difference between the requested quality and the detected quality, wherein the difference between the requested quality and the detected quality is included in the items of the quality report.

2. The information processing apparatus according to claim 1, wherein the instructions are executable by the one or more processors to cause the information processing apparatus to notify, in a case where the detected quality of the print product printed based on the print data by the production system satisfies the requested quality, that the detected quality satisfies the requested quality.

3. The information processing apparatus according to claim 1, wherein the information is received from the production system via a network.

4. The information processing apparatus according to claim 3, wherein, in a case where the quality request data includes a quality verification instruction for satisfying the quality requested by the quality request data, the information is received from the production system via the network.

5. The information processing apparatus according to claim 1,
wherein the production system includes an inspection apparatus and a printing apparatus that prints the print product based on the print data, and
wherein the inspection apparatus detects the quality of the print product printed by the printing apparatus.

6. The information processing apparatus according to claim 5, wherein the inspection apparatus detects the quality of the print product based on an inspection instruction transmitted by the information processing apparatus.

7. The information processing apparatus according to claim 5, wherein the inspection apparatus detects the quality of the print product by capturing the print product printed by the printing apparatus.

8. The information processing apparatus according to claim 1, wherein the requested quality is a quality regarding a color,
wherein the detected quality is a quality regarding a color, and
wherein the difference is a color difference.

9. The information processing apparatus according to claim 1, wherein a format of the quality request data is Print Requirement eXchange (PRX), and wherein the difference is notified by Print Quality eXchange (PQX) to a print data transmitting apparatus that transmitted the print data.

10. A method of controlling an information processing apparatus, the method comprising:
receiving print data and quality request data including information indicating a requested quality of a print product to be printed based on the print data;
transmitting the print data and an instruction based on the quality request data to a production system;
generating items of a quality report based on the quality request data;
receiving, from the production system, information about a print product printed based on the print data by the production system, the information about the print product being generated based on the instruction;
determining, based on the information about the print product and the information indicating the requested quality, whether a detected quality of the print product printed based on the print data by the production system satisfies the requested quality; and
notifying, in a case where the detected quality of the print product printed based on the print data by the production system does not satisfy the requested quality, a difference between the requested quality and the detected quality, wherein the difference between the requested quality and the detected quality is included in the items of the quality report.

11. The method according to claim 10, wherein, in a case where the detected quality of the print product printed based on the print data by the production system satisfies the requested quality, it is notified that the detected quality satisfies the requested quality.

12. The method according to claim 10, wherein the information is received from the production system via a network.

13. The method according to claim 12, wherein, in a case where the quality request data includes a quality verification instruction for satisfying the quality requested by the quality request data, the information is received from the production system via the network.

14. The method according to claim 10,
wherein the production system includes an inspection apparatus and a printing apparatus that prints the print product based on the print data, and
wherein the quality of the print product printed by the printing apparatus is detected by the inspection apparatus.

15. The method according to claim 14, wherein the quality of the print product is detected by the inspection apparatus based on an inspection instruction transmitted by the information processing apparatus.

16. The method according to claim 10, wherein the requested quality is a quality regarding a color,
wherein the detected quality is a quality regarding a color, and
wherein the difference is a color difference.

17. The method according to claim 10, wherein the a format of the quality request data is Print Requirement eXchange (PRX), and
wherein the difference is notified by Print Quality eXchange (PQX) to a print data transmitting apparatus that transmitted the print data.

18. A non-transitory computer-readable storage medium that stores a program for causing a computer to execute a method of controlling an information processing apparatus, the method comprising:
receiving print data and quality request data including information indicating a requested quality of a print product to be printed based on the print data;
transmitting the print data and an instruction based on the quality request data to a production system;
generating items of a quality report based on the quality request data;
receiving, from the production system, information about a print product printed based on the print data by the production system, the information about the print product being generated based on the instruction;
determining, based on the information about the print product and the information indicating the requested quality, whether a detected quality of the print product printed based on the print data by the production system satisfies the requested quality; and
notifying, in a case where the detected quality of the print product printed based on the print data by the production system does not satisfy the requested quality, a difference between the requested quality and the detected quality, wherein the difference between the requested quality and the detected quality is included in the items of the quality report.

* * * * *